US007312801B2

(12) United States Patent
Stollnitz

(10) Patent No.: US 7,312,801 B2
(45) Date of Patent: Dec. 25, 2007

(54) HARDWARE ACCELERATED BLEND MODES

(75) Inventor: Eric J. Stollnitz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 11/065,854

(22) Filed: Feb. 25, 2005

(65) Prior Publication Data

US 2006/0192788 A1    Aug. 31, 2006

(51) Int. Cl.
*G09G 5/00* (2006.01)
*G06F 15/16* (2006.01)
*G06F 1/00* (2006.01)
*G06F 15/00* (2006.01)
*G09G 5/10* (2006.01)

(52) U.S. Cl. ............ 345/592; 345/581; 345/589; 345/586; 345/502; 709/212; 709/201

(58) Field of Classification Search ............... 345/418, 345/422, 428, 581, 582, 592, 597, 586–589, 345/501–503, 519, 522, 549, 552, 564, 690; 709/201–203, 212–213; 358/515–520; 382/162–167
See application file for complete search history.

(56) References Cited

U.S. PATENT DOCUMENTS

| | | | | |
|---|---|---|---|---|
| 5,704,025 A | * | 12/1997 | Berry | 345/589 |
| 5,847,717 A | * | 12/1998 | Berry | 345/506 |
| 6,437,781 B1 | * | 8/2002 | Tucker et al. | 345/426 |
| 2003/0158886 A1 | * | 8/2003 | Walls et al. | 709/201 |
| 2004/0104917 A1 | * | 6/2004 | Platt et al. | 345/589 |
| 2005/0122334 A1 | * | 6/2005 | Boyd et al. | 345/520 |
| 2007/0165035 A1 | * | 7/2007 | Duluk et al. | 345/506 |

OTHER PUBLICATIONS

Porter, T. et al., "Compositing Digital Images" *Computer Grpahics*, Jul. 1984, 18(3), 253-259.
Scalable Vector Graphics (SVG) 1.2 Specification, W3C Working Draft Apr. 13, 2005, http://www.w3.org/TR/SVG12, 5 pages.

* cited by examiner

*Primary Examiner*—Wesner Sajous
(74) *Attorney, Agent, or Firm*—Woodcock Washburn LLP

(57) ABSTRACT

Blending colors of source and destination primitives by a graphics processing unit is disclosed. The graphics processing unit executes a blending program that blends the primitives. The graphics processing unit receives the blending program from a central processing unit or a graphics application program. For example, the graphics processing unit draws a source primitive in a source texture map and a destination primitive in a destination texture map. The blending program (e.g., a pixel shader) is set to be applied to the primitives, and the graphics processing unit applies the blend mode to each pixel of the primitives, rendering a composite primitive in a destination render target.

19 Claims, 4 Drawing Sheets

HARDWARE ACCELERATED BLEND MODES

FIELD OF THE INVENTION

The invention generally relates to the field of computer graphics and specifically to computer hardware rendering of graphical information.

BACKGROUND OF THE INVENTION

A blend mode is a formula used in combining a color of a source primitive with a color of a destination primitive to produce a new color in a rendered primitive. A primitive is the simplest object that typical graphics processing units draw, and primitives may be combined to form more robust images, shapes, backgrounds, graphics, etc. A source primitive may be a primitive that is rendered atop of an existing primitive, and a destination primitive may be the existing primitive. When using a particular blend mode to render a source primitive into a destination primitive, the blend mode may be applied to each pixel of the source and destination primitives. In this way, a blend mode may be applied to each pixel of a source and of a destination primitive to calculate a new color for each pixel of a rendered primitive.

A color of a pixel may be described by a combination of four components. Three of the components may represent the amount of red R, green G, and blue B in the color. These components may be labeled R, G, and B, each of which may be a floating-point number ranging from 0 to 1. A fourth component may be an alpha A value and may represent an opacity of a pixel. An alpha A value of 0 may describe the pixel as transparent, an alpha A value of 1 may describe the pixel as opaque, and a fractional alpha A value may describe a degree of translucence of the pixel. The four values of R, G, B, and A thus may define a pixel's color and opacity.

Formulas for blend modes may be written in a variety of ways. Graphics processing units may provide built-in support for a formula that computes components of a new color N from components of a source color S and a destination color D. The formulas may include parameters, P and Q, which may determine how a blend mode behaves. A parameter P, called a "source blend factor," may be chosen from a set $\{0, 1, D_A, 1-D_A, D_C, 1-D_C\}$. Similarly, a parameter Q, called a "destination blend factor," may be chosen from a set $\{0, 1, S_A, 1-S_A, S_C, 1-S_C\}$. Blend modes that may be built in a graphics processing unit to produce a new color or opacity N for each pixel may include:

$$N_R = P \cdot S_R + Q \cdot D_R$$

$$N_G = P \cdot S_G + Q \cdot D_G$$

$$N_B = P \cdot S_B + Q \cdot D_B$$

$$N_A = P \cdot S_A + Q \cdot D_A$$

Blend modes may be achieved using the P and Q parameters, as listed in the following table, Table 1:

TABLE 1

Example values for parameters P and Q

| Blend mode | P | Q |
|---|---|---|
| Clear | 0 | 0 |
| Source | 1 | 0 |
| Destination | 0 | 1 |
| Source Over | 1 | $1 - S_A$ |
| Destination Over | $1 - D_A$ | 1 |
| Source In | $D_A$ | 0 |
| Destination In | 0 | $S_A$ |
| Source Out | $1 - D_A$ | 0 |
| Destination Out | 0 | $1 - S_A$ |
| Source Atop | $D_A$ | $1 - S_A$ |
| Destination Atop | $1 - D_A$ | $S_A$ |
| Exclusive Or | $1 - D_A$ | $1 - S_A$ |
| Add | 1 | 1 |
| Screen | $1 - D_C$ | 1 |

Parameters in addition to P and Q may be added to blend modes to provide additional variations for blend modes. For example, parameters X, Y, and Z may be used and may be constants with values of 0 or 1. When compositing an opaque source primitive with an opaque destination primitive, X may determine whether an intersection of the source and destination appears in a composite primitive, Y may determine whether a part of the source primitive outside the destination primitive appears, and Z may determine whether a part of the destination primitive outside the source primitive appears. A function f may be a function of the source and destination colors. The following equations may provide a more general formulation of blend modes, again computing a new color or opacity N from a given source color S and destination color D for each pixel:

$$N_R = f(S_R, S_A, D_R, D_A) + Y \cdot S_R \cdot (1-D_A) + Z \cdot D_R \cdot (1-S_A)$$

$$N_G = f(S_G, S_A, D_G, D_A) + Y \cdot S_G \cdot (1-D_A) + Z \cdot D_G \cdot (1-S_A)$$

$$N_B = f(S_B, S_A, D_B, D_A) + Y \cdot S_B \cdot (1-D_A) + Z \cdot D_B \cdot (1-S_A)$$

$$N_A = X \cdot S_A \cdot D_A + Y \cdot S_A \cdot (1-D_A) + Z \cdot D_A \cdot (1-S_A)$$

Some blend modes may be included with, for example, drivers for a graphics processing unit, and other blend modes may be supplied by a graphics application program. Example parameter values for such blend modes are listed in the following table, Table 2:

TABLE 2

Example parameters for general blend formulas

| Blend mode | $f(S_C, S_A, D_C, D_A)$ | X | Y | Z |
|---|---|---|---|---|
| Clear | 0 | 0 | 0 | 0 |
| Source | $S_C \cdot D_A$ | 1 | 1 | 0 |
| Destination | $D_C \cdot S_A$ | 1 | 0 | 1 |
| Source Over | $S_C \cdot D_A$ | 1 | 1 | 1 |
| Destination Over | $D_C \cdot S_A$ | 1 | 1 | 1 |
| Source In | $S_C \cdot D_A$ | 1 | 0 | 0 |
| Destination In | $D_C \cdot S_A$ | 1 | 0 | 0 |
| Source Out | 0 | 0 | 1 | 0 |
| Destination Out | 0 | 0 | 0 | 1 |
| Source Atop | $S_C \cdot D_A$ | 1 | 0 | 1 |
| Destination Atop | $D_C \cdot S_A$ | 1 | 1 | 0 |
| Exclusive Or | 0 | 0 | 1 | 1 |
| Add | $S_C \cdot D_A + D_C \cdot S_A$ | 1 | 1 | 1 |
| Screen | $S_C \cdot D_A + D_C \cdot S_A - S_C \cdot D_C$ | 1 | 1 | 1 |
| Multiply | $S_C \cdot D_C$ | 1 | 1 | 1 |
| Overlay | $2 \cdot S_C \cdot D_C$, if $2 \cdot D_C < D_A$; $S_C \cdot D_C - 2 \cdot (D_A - D_C) \cdot (S_A - S_C)$, otherwise | 1 | 1 | 1 |
| Lighten | $\max(S_C \cdot D_A, D_C \cdot S_A)$ | 1 | 1 | 1 |
| Darken | $\min(S_C \cdot D_A, D_C \cdot S_A)$ | 1 | 1 | 1 |
| Color Dodge | $S_A \cdot D_A$, if $S_C \cdot D_A + D_C \cdot S_A \geq S_A \cdot D_A$; $D_C \cdot S_A/(1 - S_C/S_A)$, otherwise | 1 | 1 | 1 |
| Color Burn | 0, if $S_C \cdot D_A + D_C \cdot S_A \leq S_A \cdot D_A$; $S_A \cdot (S_C \cdot D_A + D_C \cdot S_A - S_A \cdot D_A)/S_C$, otherwise | 1 | 1 | 1 |
| Hard Light | $2 \cdot S_C \cdot D_C$, if $2 \cdot S_C < S_A$; $S_A \cdot D_A - 2 \cdot (D_A - D_C) \cdot (S_A - S_C)$, otherwise | 1 | 1 | 1 |
| Soft Light | $D_C \cdot (S_A - (1 - D_C/D_A) \cdot (2 \cdot S_C - S_A))$, if $2 \cdot S_C < S_A$; $D_C \cdot (S_A - (1 - D_C/D_A) \cdot (2 \cdot S_C - S_A) \cdot (3 - 8 \cdot D_C/D_A))$, if $8 \cdot D_C \leq D_A$; $D_C \cdot S_A + (D_A \cdot (D_C/D_A)^{0.5} - D_C) \cdot (2 \cdot S_C - S_A)$, otherwise | 1 | 1 | 1 |
| Difference | $\mathrm{abs}(S_C \cdot D_A - D_C \cdot S_A)$ | 1 | 1 | 1 |
| Exclusion | $S_C \cdot D_A + D_C \cdot S_A - 2 \cdot S_C \cdot D_C$ | 1 | 1 | 1 |

Typically, graphics processing units apply a few blend modes. For more complex or varied blend modes, graphics application programs may perform some or all of their rendering calculations through software on a central processing unit. That is, the central processing unit may perform the blending of two primitives and then send a bitmap to the graphics processing unit for rendering. The speed of execution of graphics application programs therefore may be limited by the rendering speed at which the central processing unit can render pixels of a composite primitive. The rendering speed of a central processing unit may be slower than the rendering speed of the graphics processing unit.

For example, a graphics application program may specify that a particular primitive, when drawn atop other primitives, should darken the colors of the other primitives. The amount of darkening applied to the existing primitives may be controlled by a luminance of the newly drawn primitive according to a blend mode. Typically, blend modes may be applied by the central processing unit for each pixel covered by the new primitive in the composite rendering.

Using the central processing unit to apply a blend mode pixel by pixel may slow application executions as the rendering process is completed. Additionally, central processing units may be pulled from completing other work to apply the blend mode, thus potentially slowing the performance of other tasks. In a client-server scenario, the server central processing unit may apply the blend mode and then transmit all the pixels of a composite primitive from the server to the client, consuming valuable bandwidth.

There is a need, therefore, for methods and apparatus for more efficiently rendering blend modes while taking advantage of the speed of a graphics processing unit. The methods and apparatus additionally should minimize the volume of calculations required of a central processing unit and the bandwidth required in the rendering process.

SUMMARY OF THE INVENTION

The present invention enables graphics application program blend modes to be calculated on a graphics processing unit rather than on a central processing unit. The invention may take advantage of pipelined parallelism of current graphics hardware, free the central processing unit to perform other functions, and reduce transmission of pixels of composite primitives from a server to a client. A graphics application program code calling for a blending of two or more primitives may send a central processing unit a program that, when executed, may apply a blend mode for the blending. The central processing unit may send the program to the graphics processing unit for execution.

The graphics processing unit may execute the program, and, for example, draw a source primitive in a source texture map and draw a destination primitive in a destination texture map. The program for applying the blend mode to the primitives may be set to be applied to the source and destination texture maps. The graphics processing unit may then apply the blend mode to each pixel of the primitives, and render a composite primitive in a destination render target.

BRIEF DESCRIPTION OF THE DRAWINGS

The foregoing summary and the following detailed description of the invention are better understood when read in conjunction with the appended drawings. Embodiments of the invention are shown in the drawings, however, it is understood that the invention is not limited to the specific methods and instrumentalities depicted therein. In the drawings.

DETAILED DESCRIPTION OF ILLUSTRATIVE EMBODIMENTS

Example Computing Environment

Figure 1:
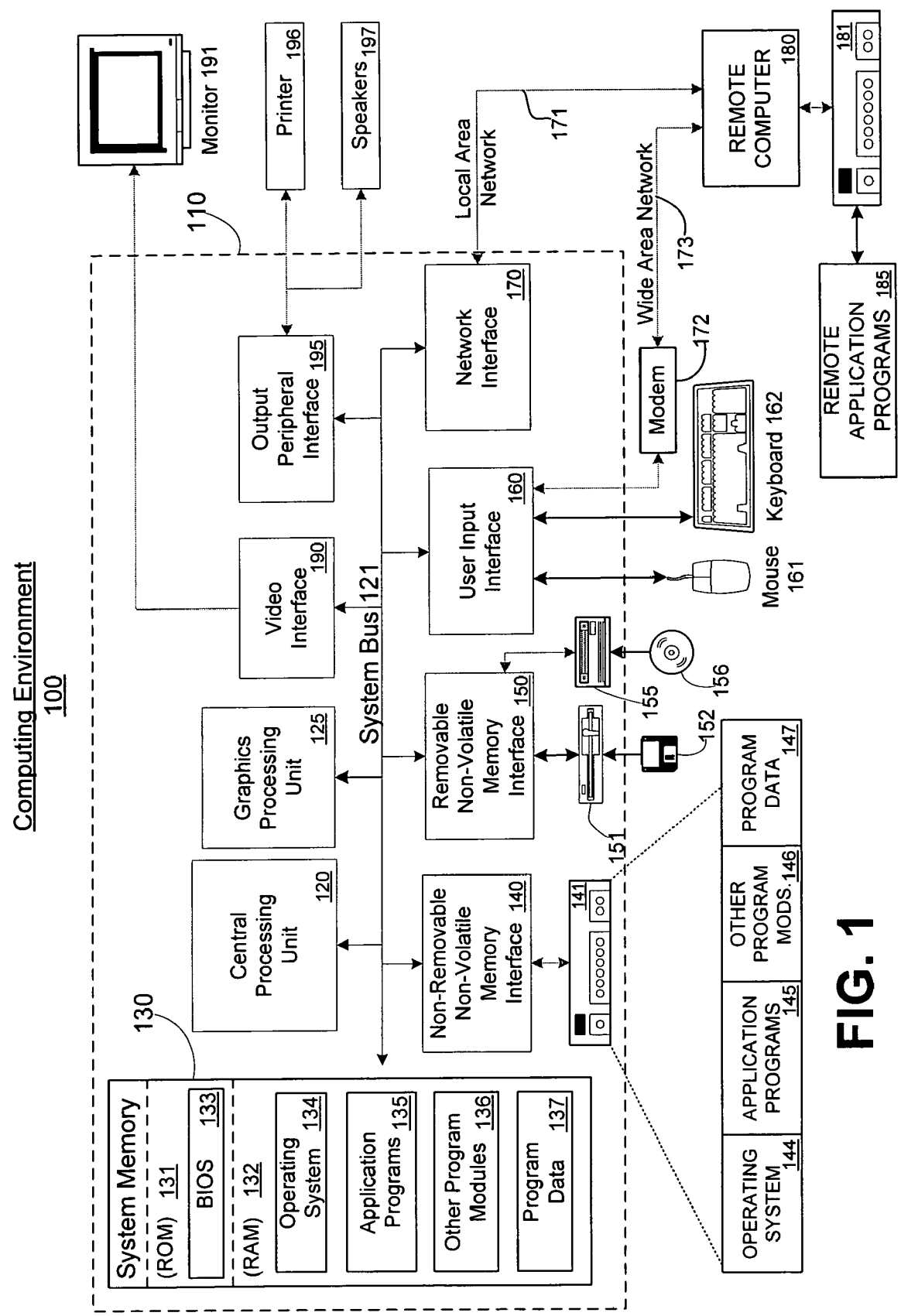
FIG. 1 is a block diagram showing an example computing environment in which aspects of the invention may be implemented.

FIG. 1 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a central processing unit 120, a graphics processing unit 125, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). Computer 110 may additionally include an accelerated graphics bus through which the graphics processing unit 125 and the video interface 190 may communicate with the monitor 191.

The graphics processing unit 125 may render primitives and combinations of primitives (e.g., images, shapes, backgrounds, graphics, etc.) on the monitor 191 by, for example, transforming graphic points from the primitives to respective buffers, calculating lighting at each pixel, calculating texture on surfaces, and rendering the primitives.

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 2:
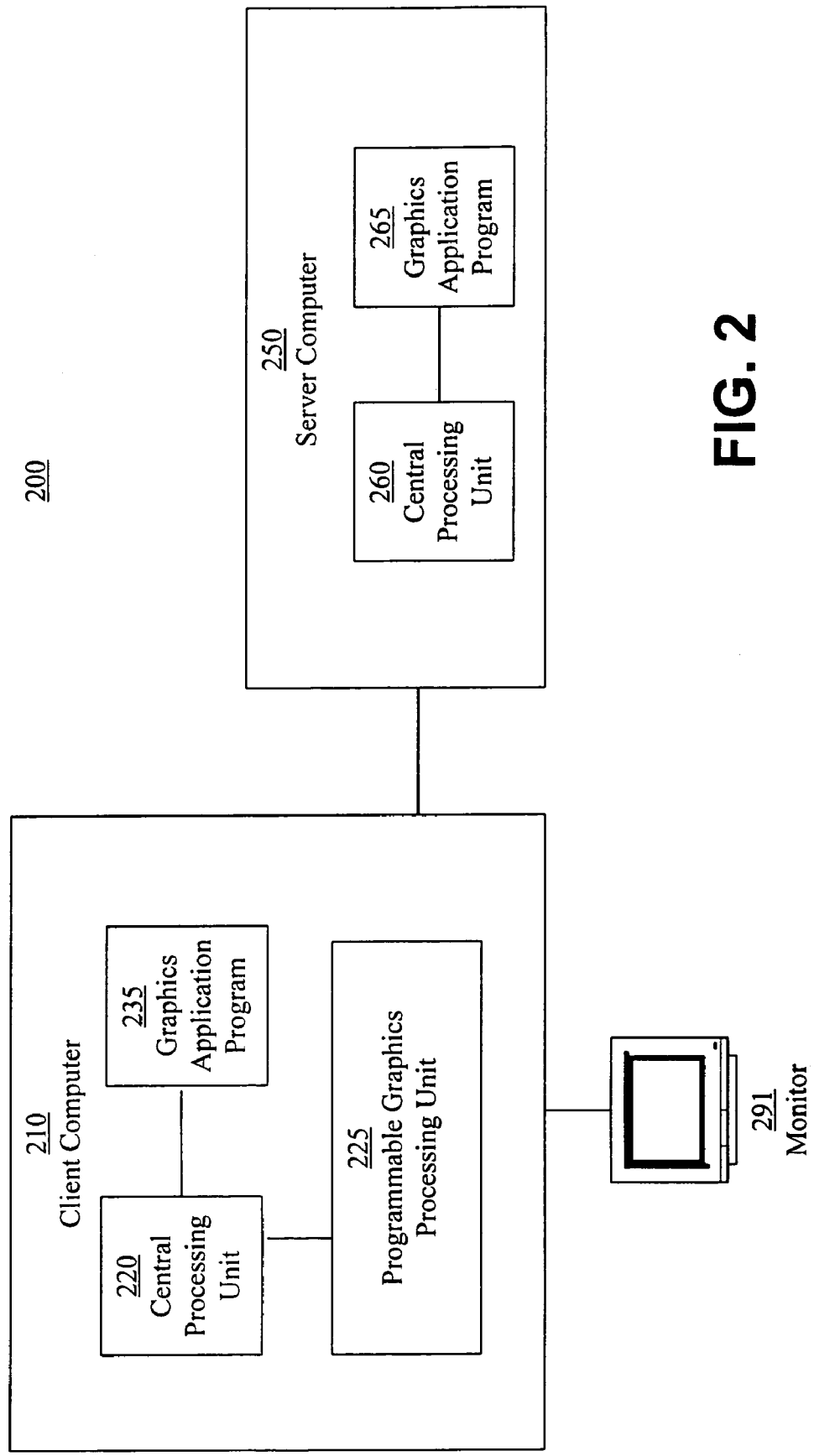
FIG. 2 is a block diagram of an example system for providing hardware accelerated blend modes according to the invention.

FIG. 2 is a block diagram of an example system 200 for providing hardware accelerated blend modes according to the invention. The system 200 may include a client computer 210 in communication with a server computer 250. It will be understood that embodiments of the invention may be implemented on the client computer 210 or the server computer 250 alone, and that the system 200 depicts one of many example implementations of the invention.

The client computer 210 and the server computer 250 each may be the computer 110 described with regard to FIG. 1. The client computer 210 may include a central processing unit 220, a graphics application program 235, and a programmable graphics processing unit 225 and may provide a display to the monitor 291. The server computer 250 may include a central processing unit 260 and a graphics application program 265. Of course the client computer 210 and the server computer 250 may include other components and may be in communication with other devices, such as those described with regard to FIG. 1.

The programmable graphics processing unit 225 may be a hardware device that renders primitives and combinations of primitives (e.g., images, shapes, backgrounds, graphics, etc.) on the monitor 291. The programmable graphics processing unit 225 may render primitives by, for example, transforming graphic points from the primitives to respective buffers, calculating lighting at each pixel, calculating texture on surfaces, etc., and rendering the primitives on the monitor 291. The programmable graphics processing unit 225 may be in communication with the central processing unit 220 of the client computer 210. Alternatively or additionally, the programmable graphics processing unit 225 may be, through the client computer 210, in communication with the central processing unit 260 of the server computer 250.

The graphics application programs 235, 265 each may be any application that provides for rendering graphical information such as primitives. Such primitives may be anything rendered in a buffer or displayed on a monitor. Primitives may be combined and rendered as, for example, pictures, video, images, text, graphics, or shapes. The graphics application programs 235, 265 may implement, through a graphics processing unit, blend modes for blending a source primitive with a destination primitive. Blend modes may be implemented or applied to a primitive through execution of a separate function, program, module, or the like, commonly referred to as a pixel shader. As used herein, the term pixel shader means program code that applies a blend mode. The graphics application programs 235, 265 may provide for the application of a blend mode in a pixel shader, and each pixel shader may be a function or program for executing a blend mode.

The graphics application programs 235, 265 may communicate with or be executed by respective central processing units 220, 260. During execution of the graphics application program 235, a source primitive may be called to be blended with a destination primitive according to a blend mode. The graphics application program 235 may send to the central processing unit 220 a pixel shader. In accordance with the present invention, instead of executing the pixel shader on the central processing unit, the graphics application program 235 may direct the central processing unit 220 to send the pixel shader to the programmable graphics processing unit 225. The central processing unit 220 may direct the programmable graphics processing unit 225 to execute the pixel shader. The pixel shader may thus facilitate applying the blend mode to each pixel of the source and destination primitives and render a composite primitive. That is, the programmable graphics processing unit 225 may be directed to blend, according to the blend mode, the source and destination primitives. The programmable graphics processing unit 225 may execute the pixel shader to apply the blend mode to each pixel of the source and destination primitives and to render the composite primitive, for example, on the monitor 291. Alternatively, the graphics application program 235 may communicate with an application serving as an intermediary between the graphics application program 235 and the graphics processing unit 225. Such an intermediary application may be a graphics processing unit driver or a graphics library comprising pixel shaders. The graphics application program 235 may direct the intermediary application to provide an appropriate pixel shader to the programmable graphics processing unit 225 for a blending operation. The intermediary application may then select an appropriate pixel shader to provide the appropriate blending and send the pixel shader to the graphics processing unit for execution.

In an alternative embodiment, the graphics application program 265 running on the server computer 250 may send a pixel shader to the central processing unit 260, directing the central processing unit 260 to send it to the client computer 210 for execution on the programmable graphics processing unit 225. The central processing unit 260 may direct the programmable graphics processing unit 225 to execute the pixel shader and render a composite primitive.

Figure 3:
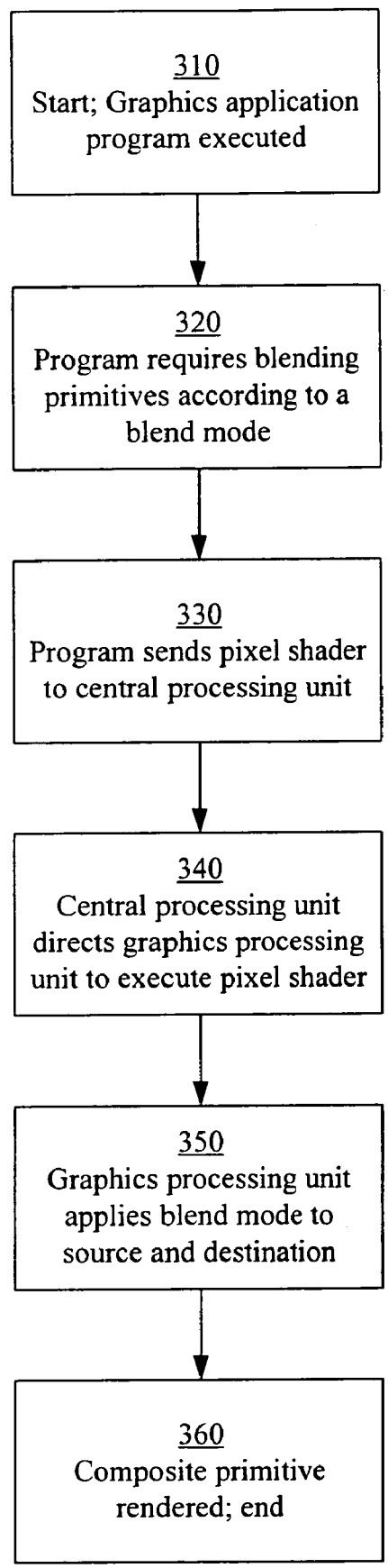
FIG. 3 is a flow diagram of an example method for providing hardware accelerated blend modes according to the invention.

FIG. 3 is a flow diagram of an example method 300 for providing hardware accelerated blend modes according to the invention. The method may commence at step 310 with a graphics application program (e.g., an application calling for a primitive to be rendered on a display) being executed on a computer. The computer may be the client computer 210 or the server computer 250 of FIG. 2, or some other computer. At step 320, the graphics application program may provide for or require a source primitive to be blended with a destination primitive for rendering in a buffer (e.g., a display). The graphics application program may, at step 330, send to the central processing unit a program code that, when executed, applies a blend mode. Such program code may comprise a pixel shader.

At step 340, the central processing unit may send the program code to a programmable graphics processing unit for execution. The programmable graphics processing unit may, at step 350, execute the program code to apply the blend mode to each pixel of the source and destination primitives. A composite primitive may then be rendered on a display buffer at step 360.

Figure 4:
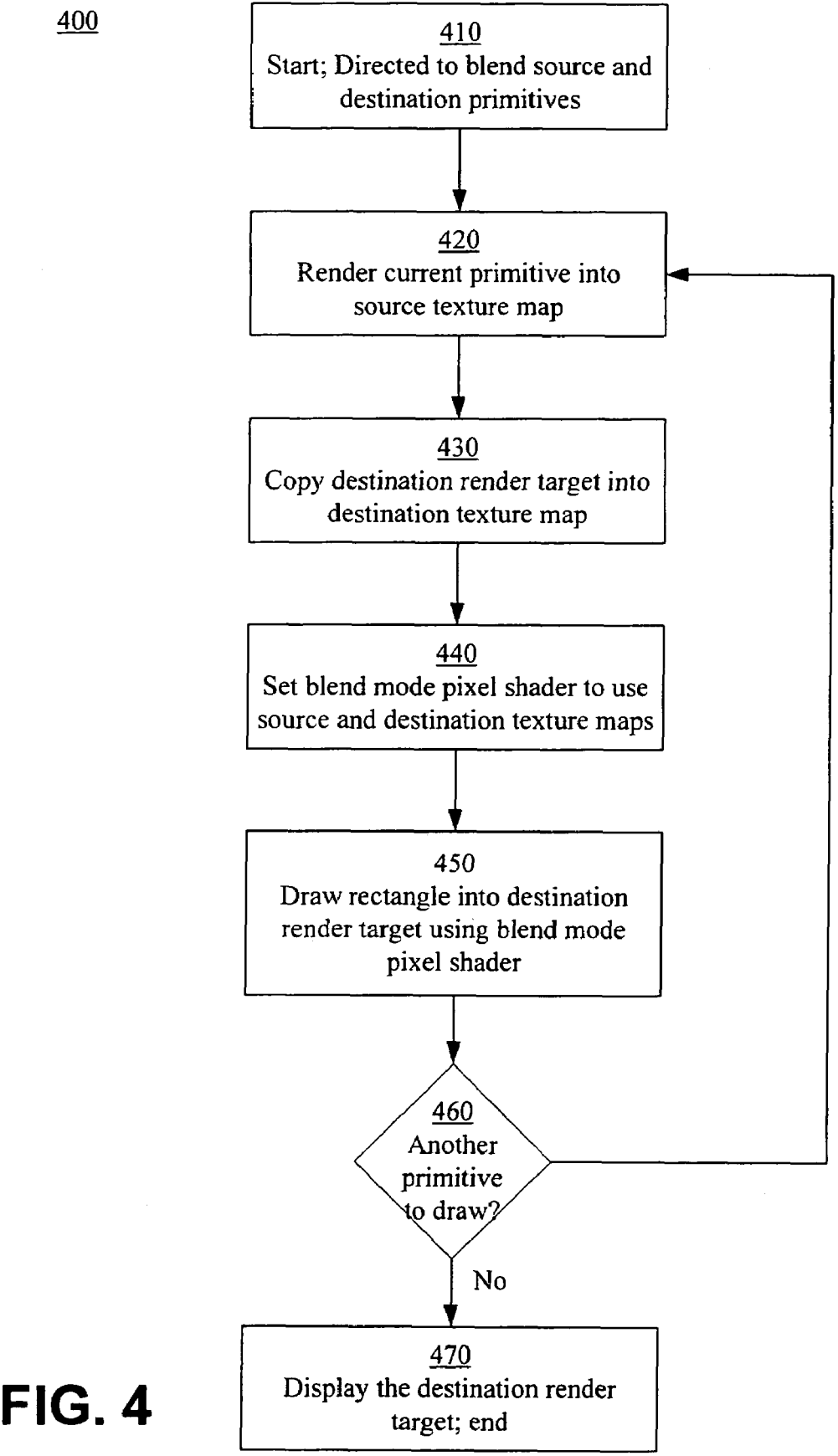
FIG. 4 is a flow diagram of an alternative example method for providing hardware accelerated blend modes according to the invention.

FIG. 4 is a flow diagram of an alternative example method 400 for providing hardware accelerated blend modes according to the invention. The method may commence at step 410 with a programmable graphics processing unit being directed to blend a source primitive with a destination primitive using, for example, a supplied pixel shader. The pixel shader may be supplied by, for example, a graphics application program, a driver, a graphics library, or an operating system. At step 420, the source primitive may be received and rendered to a temporary texture map, the temporary texture map hereinafter referred to as a source texture map. The source primitive may be received from a central processing unit that received it from a graphics application program.

A copy of the destination primitive from the render target may be made and placed in a temporary texture map at step 430. This temporary texture map is hereinafter referred to as the destination texture map. It will be understood that step 430 may be performed if the programmable graphics processing unit used does not provide for a pixel shader to read pixel colors directly from the destination render target. If an architecture for a programmable graphics processing unit enables or allows reading from and writing to the same render target, step 430 may be eliminated from the method 400.

At step 440, the pixel shader may be set to use the source and destination texture maps during its execution. The programmable graphics processing unit may execute the pixel shader at step 450, applying the blend mode to each pixel of the source and destination texture maps and drawing a filled rectangle into the destination render target. That is, the programmable graphics processing unit may combine a source pixel color and a destination pixel color to produce a result color that will be placed in the destination render target for each pixel. It will be understood that the pixel shader may be developed to process blend modes such as those herein described and others using, for example, pixel shader assembly language or a higher-level shading language. If at step 450, more primitives are to be rendered, then the process may repeat from step 420. If at step 450, no more primitives are to be rendered, then the destination render target may be displayed.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed is:

1. A method for performing a blend mode operation on behalf of an application program executing on a first processing unit, comprising:
receiving first information representative of a color of a first pixel;
receiving second information representative of a color of a second pixel;
receiving information representative of a formula for blending the color of the first pixel with the color of the second pixel; and
applying the formula to the first information and the second information to produce third information representative of a color of a third pixel adapted to be displayed on a computer monitor, wherein applying the formula is performed by a second processing unit, wherein receiving the information representative of the formula comprises receiving program code that, when executed on the second processing unit, causes the second processing unit to apply the formula for blending the color of the first pixel with the color of the second pixel, and
wherein the first pixel is part of a source primitive and the second pixel is part of a destination primitive, and wherein the method further comprises:
receiving at the second processing unit the destination primitive:
receiving at the second processing unit the source primitive;
setting the program code to use the source and the destination primitives;
executing the program code; and
drawing the third pixel into a destination render target.

2. The method of claim 1, wherein receiving the information representative of the formula comprises receiving the information representative of the formula from the first processing unit.

3. The method of claim 1, wherein the program code comprises at least part of a pixel shader.

4. The method of claim 1, wherein the second processing unit:
copies the destination primitive from the destination render target to produce a copy of the destination primitive, and
places the copy of the destination primitive in a destination texture map.

5. The method of claim 1, wherein the first processing unit is located on a computer and the second processing unit is located on the computer.

6. The method of claim 1, wherein the first processing unit is located on a first computer, and the second processing unit is located on a second computer.

7. The method of claim 6, wherein the first computer is a server computer and the second computer is a client of the server computer.

8. The method of claim 1, wherein the first information comprises a set of values R, G, B, and A.

9. The method of claim 1, wherein the formula is a blend mode.

10. A computer-readable medium having computer-executable instructions for performing steps, comprising:
receiving first information representative of a color of a first pixel;
receiving second information representative of a color of a second pixel;
receiving information representative of a formula for blending the color of the first pixel with the color of the second pixel;
applying the formula to the first information and the second information to produce third information representative of a color of a third pixel for display on a computer monitor, wherein applying the formula is performed by a second processing unit on behalf of an application program executing on a first processing unit;
receiving at the second processing unit a destination primitive:
receiving at the second processing unit a source primitive;
setting program code for applying the formula to the first information and the second information to use the source and destination primitives;
executing the program code; and
drawing the third pixel into a destination render target.

11. The computer-readable medium of claim 10, having further computer-executable instructions for performing the steps of:
copying the destination primitive from the destination render target, producing a copy of the destination primitive; and
placing the copy of the destination primitive in the destination texture map.

12. A method for performing a blend mode operation on behalf of an application program executing on a first processing unit, comprising:
receiving first information representative of a color of a first pixel;
receiving second information representative of a color of a second pixel;

receiving information representative of a formula for blending the color of the first pixel with the color of the second pixel; and applying the formula to the first information and the second information to produce third information representative of a color of a third pixel for display on a computer monitor, wherein applying the formula is performed by a second processing unit that receives the information representative of the formula for blending the color of the first pixel with the color of the second pixel from the first processing unit, and wherein the first processing unit is located on a first computer, and the second processing unit is located on a second computer.

13. The method of claim 12, wherein receiving the information representative of the formula comprises receiving the information representative of the formula from the first processing unit.

14. The method of claim 12, wherein receiving the information representative of the formula comprises receiving program code that, when executed on the second processing unit, causes the second processing unit to apply the formula for blending the color of the first pixel with the color of the second pixel.

15. The method of claim 14, wherein the program code comprises at least part of a pixel shader.

16. The method of claim 12, wherein the first pixel is part of a source primitive and the second pixel is part of a destination primitive, and wherein the method further comprises:

receiving at the second processing unit the destination primitive:

receiving at the second processing unit the source primitive;

setting the program code to use the source and the destination primitives;

executing the program code; and drawing the third pixel into a destination render target, and wherein the second processing unit:

copies the destination primitive from the destination render target to produce a copy of the destination primitive, and places the copy of the destination primitive in a destination texture map.

17. The method of claim 12, wherein the first computer is a server computer and the second computer is a client of the server computer.

18. The method of claim 12, wherein the first information comprises a set of values R, G, B, and A.

19. The method of claim 12, wherein the formula is a blend mode.

* * * * *